(12) United States Patent
Bastiyali

(10) Patent No.: US 11,280,128 B2
(45) Date of Patent: *Mar. 22, 2022

(54) SMART SAFE CONSOLE SYSTEM AND METHOD

(71) Applicant: Tarkan Bastiyali, New York, NY (US)

(72) Inventor: Tarkan Bastiyali, New York, NY (US)

(73) Assignee: BASTYALI INVENTIONS LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/593,657

(22) Filed: Oct. 4, 2019

(65) Prior Publication Data

US 2020/0263481 A1 Aug. 20, 2020

Related U.S. Application Data

(63) Continuation-in-part of application No. 16/277,990, filed on Feb. 15, 2019, now Pat. No. 10,440,633.

(51) Int. Cl.
| | |
|---|---|
| *H04W 48/00* | (2009.01) |
| *E05G 1/02* | (2006.01) |
| *E05G 1/024* | (2006.01) |
| *B60R 7/08* | (2006.01) |
| *B60R 16/033* | (2006.01) |
| *B60R 13/08* | (2006.01) |

(52) U.S. Cl.
CPC ................ *E05G 1/02* (2013.01); *B60R 7/087* (2013.01); *E05G 1/024* (2013.01); *B60R 13/0815* (2013.01); *B60R 16/033* (2013.01)

(58) Field of Classification Search
CPC .. H04W 48/04; H04W 4/021; B60R 11/0264; B60R 2011/0075; B60R 11/00; B60R 7/08; B60R 11/0241; B60R 11/02; G06Q 50/265; G06Q 50/26; H04M 1/04; H04M 1/60; E05G 1/02
See application file for complete search history.

(56) References Cited

U.S. PATENT DOCUMENTS

| | | | | |
|---|---|---|---|---|
| 1,036,889 | A | * | 8/1912 | Nosworthy et al. ... B65D 49/06 215/23 |
| 7,933,988 | B2 | * | 4/2011 | Nasuto .................... H04L 67/34 709/224 |
| 8,412,123 | B2 | | 4/2013 | Foster |
| 8,884,750 | B2 | * | 11/2014 | Bacal ...................... B60Q 1/00 340/439 |
| 8,971,927 | B2 | | 3/2015 | Zhou et al. |
| 9,161,208 | B2 | | 10/2015 | Inselberg |
| 9,179,297 | B2 | | 11/2015 | Osann, Jr. |
| 9,866,677 | B1 | * | 1/2018 | Maguire ............. H04M 1/6075 |
| 9,900,417 | B1 | * | 2/2018 | Ruiz ..................... H04M 1/667 |
| 9,936,065 | B2 | * | 4/2018 | Shannir ............. H04M 1/72463 |
| 10,027,795 | B1 | * | 7/2018 | Maguire ........... H04M 1/72463 |

(Continued)

*Primary Examiner* — Khawar Iqbal
(74) *Attorney, Agent, or Firm* — MG Miller Intellectual Property Law LLC

(57) ABSTRACT

A smart safe console system; the smart safe console system includes a smart safe console assembly having a smart safe body suitable to house and button configured for controlling input and output communications to and from the electronic device when a vehicle hosting the smart safe console system is in use. Smart safe console system is useful for improving vehicle safety in relation to the use of electronic devices.

6 Claims, 5 Drawing Sheets

(56) References Cited

U.S. PATENT DOCUMENTS

| | | | |
|---|---|---|---|
| 10,169,933 B1 | 1/2019 | Harrison | |
| 10,951,752 B2 * | 3/2021 | Grunfeld | H04M 1/04 |
| 2001/0050614 A1 | 12/2001 | Yang | |
| 2007/0072616 A1 | 3/2007 | Irani | |
| 2009/0002147 A1 | 1/2009 | Bloebaum et al. | |
| 2011/0183601 A1 | 7/2011 | Hannon | |
| 2011/0290903 A1 * | 12/2011 | Nagano | A61L 9/12 239/34 |
| 2012/0214408 A1 * | 8/2012 | Chronister | B60R 25/24 455/26.1 |
| 2013/0151111 A1 * | 6/2013 | Skelton | B60R 16/02 701/99 |
| 2014/0100740 A1 | 4/2014 | Chutorash | |
| 2014/0233172 A1 * | 8/2014 | Ryann | H01F 38/14 361/679.43 |
| 2014/0264075 A1 * | 9/2014 | LaPorte | A61L 9/00 250/455.11 |
| 2016/0050309 A1 | 2/2016 | Gooberman | |
| 2016/0234356 A1 * | 8/2016 | Thomas | H04B 1/3838 |
| 2016/0359233 A1 * | 12/2016 | Szakelyhidi | H01Q 9/0407 |
| 2016/0362085 A1 * | 12/2016 | Skelton | B60Q 9/00 |
| 2018/0241420 A1 * | 8/2018 | Nakano | H05K 9/0049 |
| 2019/0126843 A1 * | 5/2019 | Bouchard | B60R 16/03 |
| 2021/0213910 A1 * | 7/2021 | Moeller | B60R 25/307 |

\* cited by examiner

SMART SAFE CONSOLE SYSTEM AND METHOD

CROSS REFERENCE TO RELATED APPLICATION(S)

The present application is related to, claims priority to, and is a continuation-in-part of U.S. patent application Ser. No. 16/277,990, filed on Feb. 15, 2019, allowed, which is incorporated by reference in its entirety.

TECHNICAL FIELD

The present invention relates generally to the field of vehicle safety of existing art and more specifically relates to containment systems for electronic devices.

BACKGROUND OF THE INVENTION

The following includes information that may be useful in understanding the present disclosure. It is not an admission that any of the provided information is prior art or material to the presently described or claimed inventions, or that any publication or document that is specifically or implicitly referenced is prior art.

Electronic devices like phones, tablets, smart glasses, and the like are becoming increasingly common. Such devices can be used for a variety of tasks including messaging, phone conversations, social media, navigation, photography, etc. With so many features offered on electronic devices, many people struggle to stop using the device during times they should not such as operating a vehicle. Many vehicle accidents result from distractions caused by electronic devices, which is dangerous for public road safety.

Prior attempts to solve this problem include inhibiting all features and communications to and from electronic device. However, electronic devices offer a variety of resources that can be useful to a driver or operator. Further, family members or friends can become worried when a message or phone call is not returned. Therefore, a suitable solution is required.

U.S. Pat. No. 8,412,123 to Virginia E. Foster relates to a radio opaque container for communication devices upon a vehicle. The described radio opaque container for communication devices upon a vehicle, which has a bottom joined to four walls, a pivoting lid sealing upon the walls, a connector from the container to a vehicle, a locking mechanism keeping the lid closed, and circuitry between the locking mechanism and vehicle that engages the locking mechanism only when vehicle's electrical system is on. In an emergency, the contents within the container remain available to a vehicle operator but the container opens only when vehicle's electrical power has been turned off. The container forms a faraday cage around the contents and prevents equipment placed therein from activating and distracting a vehicle operator. In an alternate embodiment, the container includes a shelf therein.

SUMMARY

In view of the foregoing disadvantages inherent in the known art, the present disclosure provides a novel device for controlling the use of personal electronic devices while driving. The smart safe console systems disclosed to this document have an assembly mounted in a vehicle. The assembly has a safe body that during vehicle use secures an electronic device such as a personal electronic device (mobile phone or the like) against physical access but provides some access to the features of the electronic device during driving. In some embodiments, the assembly communicates with the (mobile phone) provider and with the vehicle. In some embodiments, the provider provides Internet services. Some features of the smart safe console system are implemented using sensors that receive information about the vehicle. These sensors can include, among other sensors, a proximity sensor, a motion sensor, a speed sensor, an audio sensor, and audio loudness sensor, and an impact sensor. Some embodiments of the assembly provide power or data communications with electrical accessories such as external electrical accessories. These accessories can include transmitters configured to communicate with a controller and a processor.

In some embodiments, a button initiates the ability for the user to interact with the electronic device while the device is secured against physical access by the driver or another user while the vehicle is operated. Sometimes access to the services comes through accessing a virtual assistant on the assembly, the device, or an accessory device. In some embodiments, an electrical accessary emits a fragrance.

In some embodiments, a software application executing on the electronic device executes instructions that cause the device to register and communicate with the assembly.

Some versions of the safe body are configured to include soundproofing material, which can dampen or inhibit electronic-device sounds from reaching the user. The safe body may also include a charger or docking station for the electronic device.

Certain versions employ a control module that selectively prevents or allows vehicle operation depending upon whether the electronic device is secured in the smart safe. For instance, the presence of a registered smart phone may be used by the assembly to signal the control module to remain 'off' until the smart phone has been secured in the smart safe. Some versions include an ultraviolet disinfecting device or light inside of the smart safe to supply the added feature of sanitizing the electronic device while the device is secured in the smart safe.

In some embodiments methods of using the system to secure a device and improve vehicle safety prevent the vehicle from moving or starting if the electronic device is not properly secured in the smart safe. Some of these embodiments allow access to services provided by the electronic device even while operating the vehicle through interfaces that don't compromise the safety of vehicle occupants. For instance, a virtual assistant device may be used to provide auditory control of electronic device services during vehicle operation.

For purposes of summarizing the invention, certain aspects, advantages, and novel features of the invention have been described. It is to be understood that not necessarily all such advantages may be achieved in accordance with any one particular embodiment of the invention. Thus, the invention may be embodied or carried out in a manner that achieves or optimizes one advantage or group of advantages as taught without necessarily achieving other advantages as may be taught or suggested. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a smart safe console system and method, constructed and operative according to the teachings of the present disclosure.

The various embodiments of the present invention will be described in conjunction with the appended drawings, wherein like designations denote like elements.

DETAILED DESCRIPTION

As discussed above, embodiments of the present disclosure relate to containment systems for electronic devices and more particularly to a smart safe console system and method as used to improve vehicle safety while utilizing features on electronic devices.

Generally, the present invention includes a console that may be compatible with a variety of electronic devices such as smart phones, smart watches, and smart glasses. The system may be installed in the area between an operator and a passenger, typically called the 'middle console', in any vehicle such as a train, boat, truck, or car. With electronic devices locked away in the safe of the present invention, the vehicle operator as able to devote their full attention to operation and passengers do not have to worry if the operator is texting on the electronic device, viewing a social media site, or is otherwise distracted. In some versions, the smart safe allows the driver to use the typical hands-free technology either supplied by the phone manufacturer or the car manufacturer or both. In these or other embodiments, the smart safe may have a screen or other controls to access the hands-free features while the phone is safely secured. A related feature allows a parent to allow children using the car to only receive or make calls using the hands-free features (while the phone is locked away) to the parents or someone designated by their parents.

Figure 1:
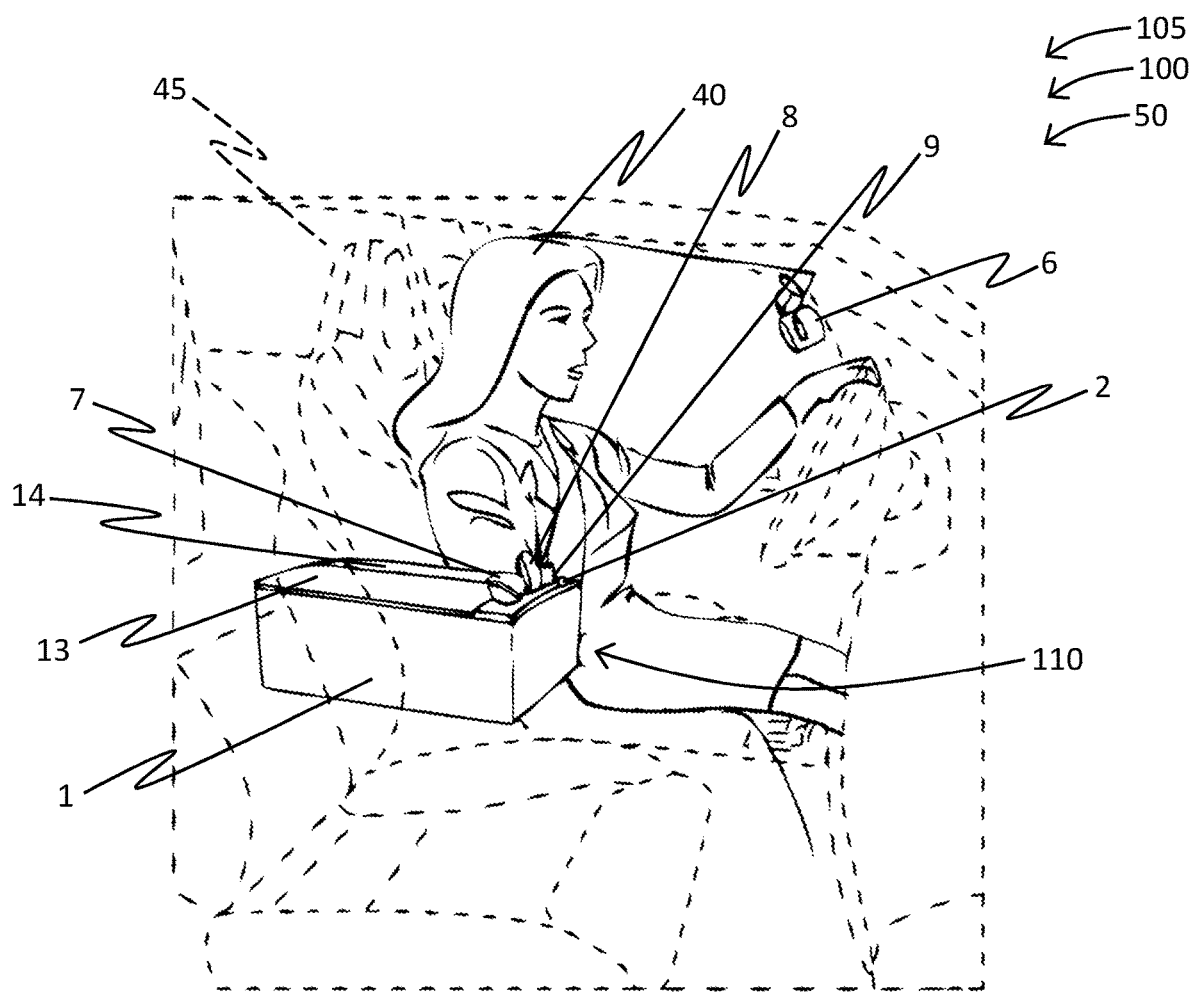
FIG. 1 is a perspective view of the smart safe console system during an 'in use' condition, according to an embodiment of the disclosure.
Figure 1:
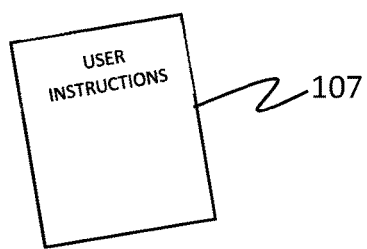

FIGS. 1-4 show various views of a smart safe console system 100. FIG. 1 shows the smart safe console system 100 during an 'in use' condition 50, according to an embodiment of the present disclosure. Here, smart safe console system 100 may be used by an operator 40 to improve vehicle safety in relation to the use of electronic devices 21. As illustrated, smart safe console system 100 may comprise a smart safe console assembly 110 including a smart safe body 1 suitable to house electronic device 21. Smart safe body 1 may isolate electronic device 21 from handheld use. For instance, system 100 may lock electronic device 21 inside system 100 while vehicle 45 operates.

Smart safe console assembly 110 may also include button 2 configured for controlling input and output communications to and from electronic device 21 (e.g., text messages) when vehicle 45, hosting smart safe console system 100, is in use. Smart safe console assembly 110 may communicate with a provider and with vehicle 45 and may control use of electronic device 21 in relation to operating vehicle 45. The provider may provide phone service or internet service to electronic device 21.

Vehicle 45 may host smart safe console system 100 such that smart safe console assembly 110 has a hardwired connection to vehicle 45 and, in some embodiments, is securely, permanently, or semi-permanently mounted in vehicle 45. Vehicle 45 may power smart safe console system 100. Alternatively, smart safe console assembly 110 may include a battery for powering smart safe console system 100. Smart safe console system 100 may employ AC or DC power distributed throughout smart safe console assembly 110 by a power supply (e.g. vehicle battery). Other powering means may be used and hardwired and non-hardwired versions may be employed.

Smart safe console assembly 110 may electrically connect to sensors that sense a condition of vehicle 45. A proximity sensor, a motion sensor, a speed sensor, an audio sensor, an impact sensor, or any combination of sensors may monitor a condition of vehicle 45. The sensors may provide one or more functions for smart safe console assembly 110 such as sending an automatically generated message from electronic device 21 to a desired message recipient when the impact sensor triggers. For example, the impact sensor may indicate that vehicle 45 has experienced a collision. The desired message recipient can be a family member, friend, or third party (i.e., police). Sensing means may vary. Smart safe console system 100 may further comprise power connector 3, such as a cigarette lighter socket, along an exterior portion of smart safe body 1 for communicating and powering one or more external electrical accessories from smart safe console assembly 110.

Another aspect of the present invention provides for electronic device 21 to host or execute a software application (app). The app may register electronic device 21 with smart safe console assembly 110 and facilitate communication between electronic device 21 and smart safe console assembly 110. Operator may register the app by a phone number or other known identification means associated with electronic device 21. The app may link to the phone service such that the phone number can be stored in a national database operated by the phone service. The app may communicate with vehicle 45 hosting smart safe console system 100 such that the app can perform one or more vehicle functions (e.g., unlocking the vehicle, rolling down the windows, etc.). Further, the app may allow for personalization of features equipped with smart safe console assembly 110. In some embodiments, smart safe console system 100 communicates specific signals to the app when the safe opens, such as a signal to remind the user to update the app and allows the signals containing the update material to transfer to electronic device 21 despite being secured within smart safe console assembly 110. In some embodiments, updating occurs as electronic device 21 charges in smart safe console assembly 110. In other embodiments, updating occurs in smart safe console assembly 110 when electronic device 21 is not charging. According to one embodiment, smart safe console system 100 may be arranged as a kit 105 and may further include a set of instructions 107.

Figure 2:
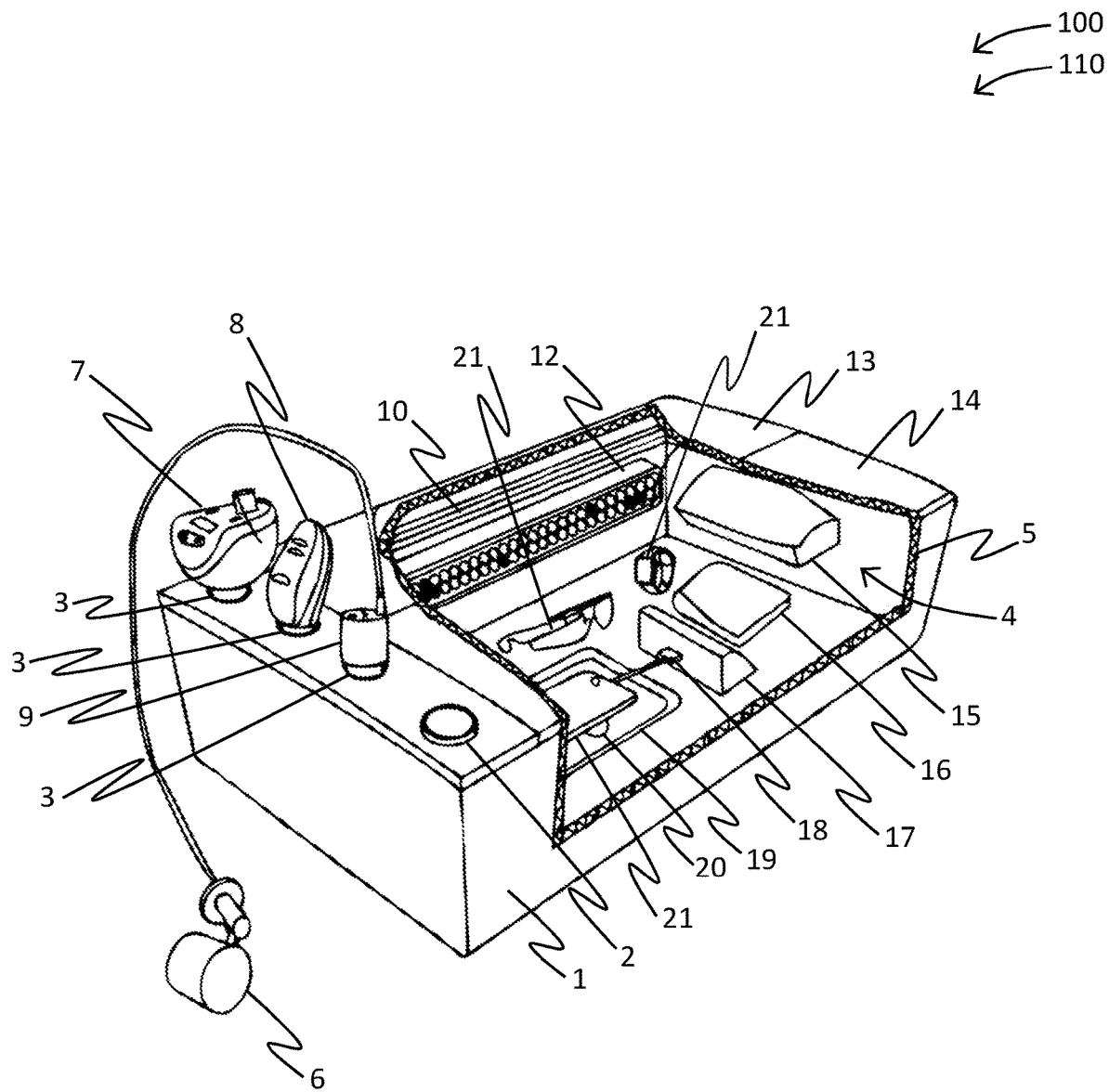
FIG. 2 is a perspective cutaway view of the smart safe console system of FIG. 1, according to an embodiment of the present disclosure.

FIG. 2 shows smart safe console system 100 of FIG. 1, according to an embodiment of the present disclosure. As above, smart safe console system 100 may include smart safe console assembly 110 including smart safe body 1 suitable to house the 21. Input and output as described herein may include sending text or voice recorded messages. External electrical accessories may include transmitter 7, virtual assistant device 9, fragrance emitter 8, or combinations of these. Power connector 3 may communicably connect to smart safe console assembly 110 such that the external electrical accessories are in communication with the provider and with vehicle 45. Each of the external electrical accessories may connect with an adapter or otherwise connect with a powered electrical contact within the power connector 3.

Smart safe body 1 may further include left wing 13 and right wing 14 configured to move between an opened state and a closed state. When in the opened state, a user may insert or remove electronic device 21 from smart safe body 1. When in the closed state, smart safe body 1 may effectively isolate electronic device 21 from handheld use. Left wing 13 and right wing 14 may include a liner 5. Furthermore, the liner 5 may extend around the entire smart safe body 1. The liner 5 may comprise a sound proofing material that dampens and inhibits electronic device 21 sounds from reaching operator 40 of vehicle 45. Sounds generated from electronic device 21 may distract operator 40 unless otherwise dampened.

Smart safe body 1 may include interior housing 4 having one or more walls, left wing 13, and right wing 14. Smart safe body 1 can have in a variety of shapes and sizes that fit in vehicle 45. For example, smart safe body 1 may include a curved surface on one or more walls or be substantially 3D rectangular or square. The interior housing 4 may have an ultraviolet light disinfecting device 12 to destroy bacteria on one or more surfaces housed within smart safe body 1. The interior housing 4 may further include sunglasses holder 15, wallet holder 16, charging unit 17, and electrical connector 18 (U.S.P.Q. electric) docking station 19, battery 20, colored LED light strips 10, or any combination of these. The colored LED light strips 10 may be customized (i.e., changing of light colors) via the app. Additionally, the interior housing may contain other items not shown in FIG. 2, such as a cooling fan for example.

Figure 3:
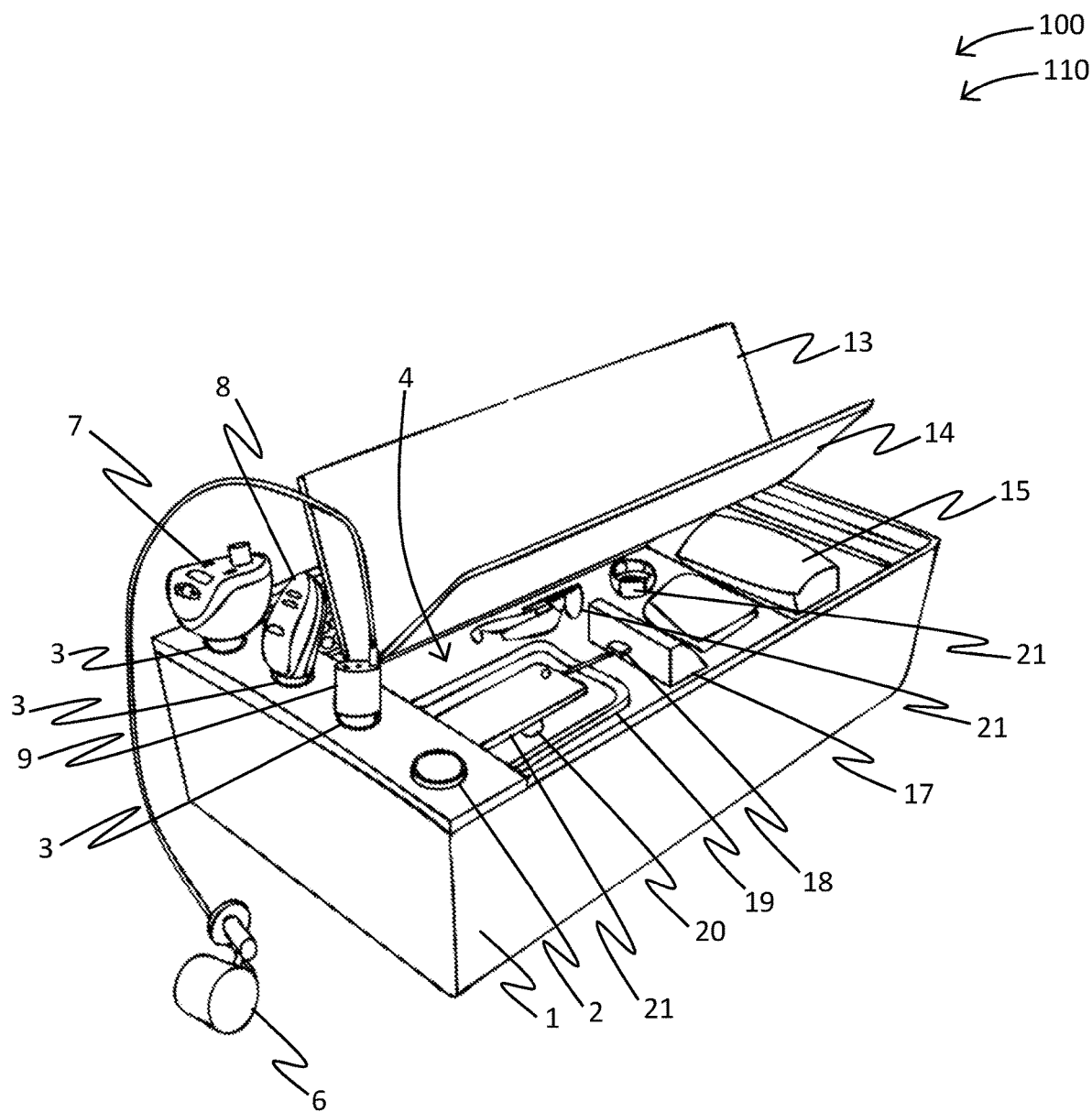
FIG. 3 is a perspective view of the smart safe console system of FIG. 1, according to an embodiment of the present disclosure.

FIG. 3 is a perspective view of smart safe console system 100 of FIG. 1, left wing 13 and right wing 14 may open on opposite sides (as shown) or they may open on the same side.

Smart safe assembly 110 may communicate with a control module that prevents operation of vehicle 45 when assembly 110 does not 'sense' a connection with electronic device 21, and that permits operation of vehicle 45 when assembly 110 senses a connection with electronic device 21. Assembly 110 may also monitor whether smart safe body 1 is open or closed. The operation sensor may detect the condition such as the connection or open or closed state (discussed previously) send information to the control module regarding the condition. Assembly 110 or the app may require electronic device 21 to register with the app before responding to the condition. In some embodiments, this allows accounting for all electronic devices 21.

Figure 4:
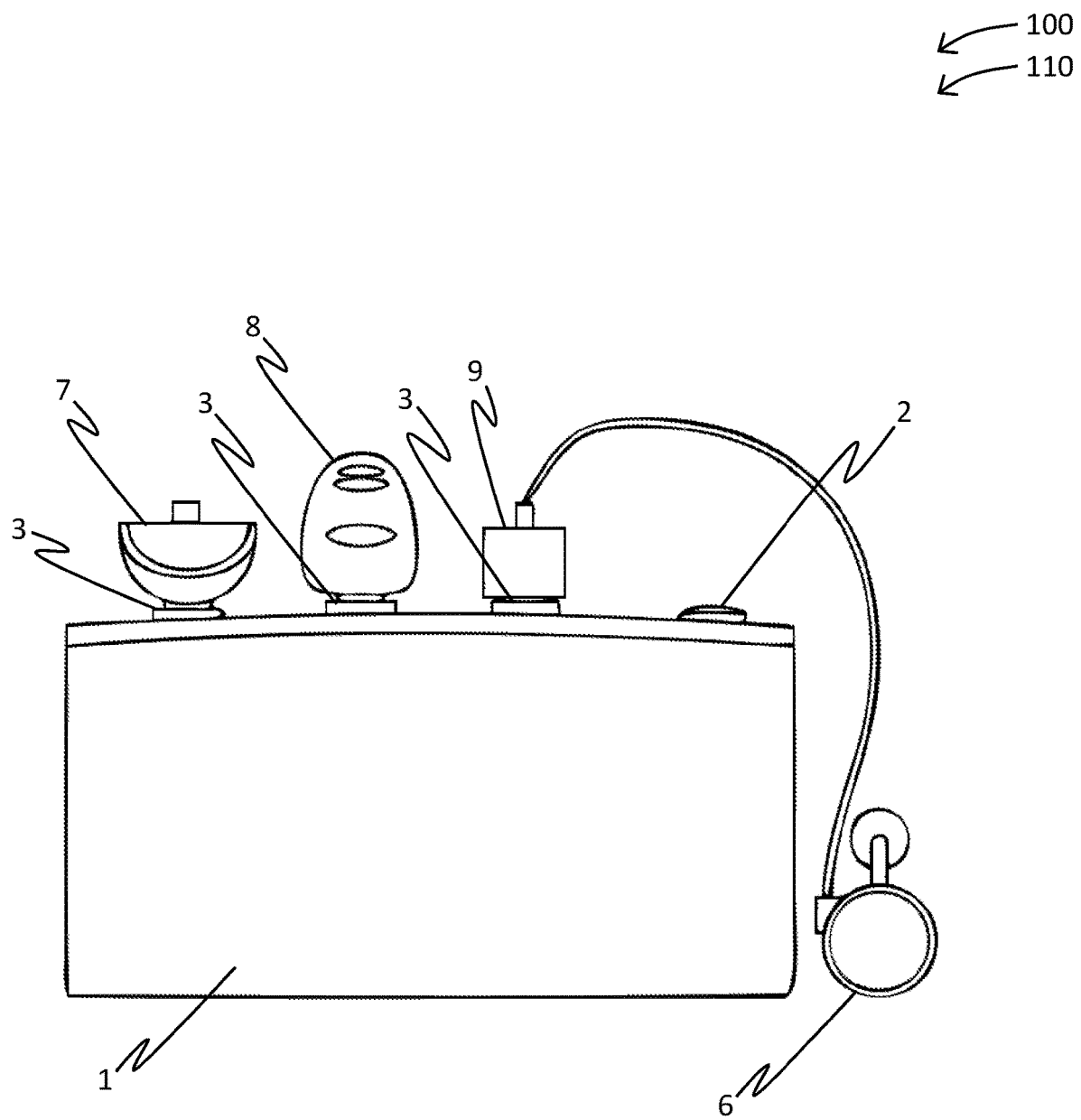
FIG. 4 is a front view of the smart safe console system of FIG. 1, according to an embodiment of the present disclosure.

FIG. 4 is a front view of smart safe console system 100 of FIG. 1, according to an embodiment of the present disclosure.

Virtual assistant device 9 may be in communication with electronic device 21 (hosting the app) and button 2 and may be configured to enable voice input communication and voice output communication between virtual assistant device 9 and electronic device 21 when a signal is received from button 2. Commonly known virtual assistant devices 9 include AMAZON ECHO, ALEXA, and GOOGLE ASSISTANT all of which may be pre-equipped with one or more speaker(s) and microphone(s) to enable the voice input communication and the voice output communication. The voice input communication and the voice output communication may include asking and receiving information ranging from the weather report to any encyclopedia question. Further, operator 40 may personalize the voice input communication and the voice output communication via virtual assistant device 9 to provide voices to be male, female, celebrity, and the like. Virtual assistant device 9 may include a cord and a suction cup 6 such that virtual assistant device 9 can be fastened to the windshield of vehicle 45.

Virtual assistant device 9 may be in communication with a navigational system (e.g., GARMIN technology) hosted in vehicle 45 or on electronic device 21. Connecting virtual assistant device 9 allows electronic device 21 to remain in smart safe body 1 while operator 40 uses this navigation technology. Operator 40 can engage button 2 to provide voice input. The voice input may provide one or more services to operator 40 such as but not limited to voice recorded messages processed on virtual assistant device 9 to send to the desired recipient via the phone service (e.g., notifying the desired recipient when operator 40 is unable to respond due to driving or send approximate times when operator 40 will be free to respond based on information received by the navigational system), purchasing one or more items via the internet service requesting a list of songs for playing on the radio, inputting personal information associated with operator 40 to be stored on electronic device 21, requesting specific responses based on the personal information (i.e. bank account information), etc. The voice output may provide one or more services to operator 40 such as reminders from the calendar on electronic device 21, reminders for ongoing conversations on electronic device 21, automatic updates for electronic device 21, responses to the voice input, and the like.

The transmitter 7 may communicate with a controller and a processor. The app may include a switch that enables communication between the transmitter 7 and the controller and the processor. Operator 40 may manually activate the switch via interfacing with the app or the navigational system can activate the switch by sending a signal that the desired destination (e.g., home) is less than a predetermined distance away. The controller and the processor may communicatively couple to one or more features within the desired destination to turn these features on/off. These features may include among other features controls for alarm systems, temperature, propane fireplaces, lighting systems, sound systems, and kitchen accessories.

Figure 5:
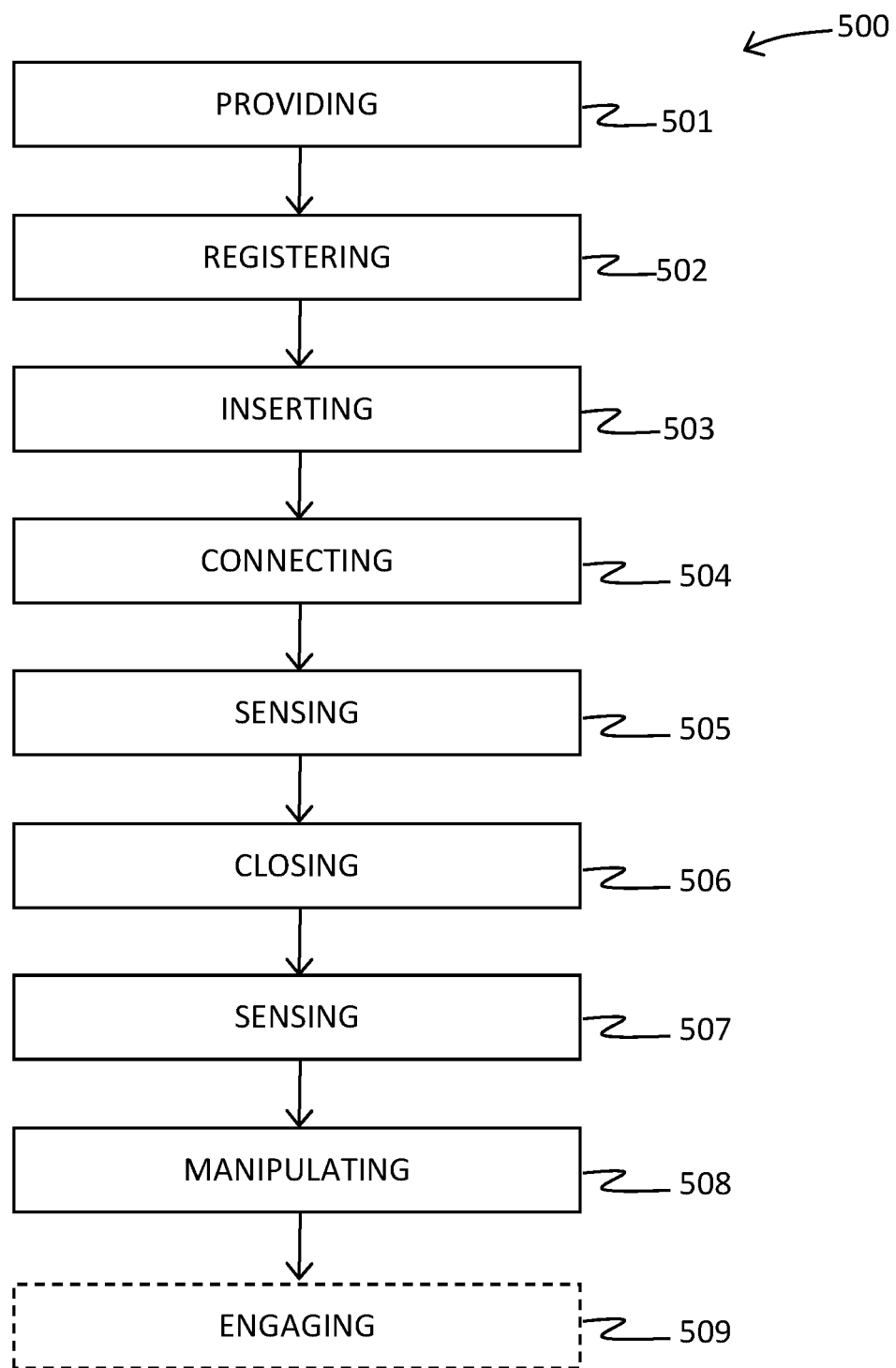
FIG. 5 is a flow diagram illustrating a method of using the smart safe console system, according to an embodiment of the present disclosure.

FIG. 5 is a flow diagram illustrating a method for using smart safe console system 500, according to an embodiment of the present disclosure. In particular, the method for using smart safe console system 500 may include one or more components or features of smart safe console system 100 as described above. As illustrated, the method for using smart safe console system 500 may include the steps of 501, providing smart safe console assembly 110 (as previously described) including smart safe body 1; step 502, registering electronic device 21 with an app in communication with smart safe assembly 110; step 503, inserting electronic device 21 into smart safe body 1; step 504, connecting electronic device 21 to a charging unit 17; step 505, sensing that an electronic device 21 is connected to the charging unit 17; step 506, closing smart safe body 1; step 507, sensing smart safe body 1 is closed; step 508, allowing vehicle 45 to turn on; and step 509, initializing button 2 for controlling the input and the output communications to and from electronic device 21.

It should be noted that step nine 509 is an optional step and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for using smart safe console system 100 (NOTE: e.g., different step orders within above mentioned list, elimination or addition of certain steps, including or excluding certain maintenance steps, etc.), are taught.

The embodiments of the invention described are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A smart safe console system comprising an assembly mounted in a vehicle, the smart safe console system including:
   a safe body, wherein the safe body opens and closes, and, when closed, the safe body secures an electronic device against physical access;
   a button that controls input to and output from the electronic device;
   a port configured to provide electronic communication with at least one electrical accessory;
   a control module that is configured to prevent the vehicle from moving unless the safe body is closed and the electronic device is secured within the safe body;
   an electromagnetic field (EMF) battery positioned below the smart safe console system and is configured prevent radiation from emitting from the electronic device when housed within the safe body; and
   a sensor to detect and communicate a signal that the electronic device is secured to the control module
   wherein the assembly communicates with a provider and with the vehicle,
   wherein the provider provides phone or Internet service,
   wherein the assembly communicates with at least one vehicle sensor to receive condition information about the vehicle,
   wherein the at least one vehicle sensor is at least one of: a proximity sensor, a motion sensor, a speed sensor, an audio sensor, an audio loudness sensor, or an impact sensor,
   wherein the at least one electrical accessory includes a transmitter configured to communicate with a controller and a processor,
   wherein the button initiates communication with a virtual assistant of the at least one electrical accessory or the electronic device,
   wherein the electronic device executes software application instructions that cause the electronic device to register and communicate with the assembly,
   wherein the safe body has a charging unit or a docking station for the electronic device.

2. The smart safe console system of claim 1, wherein the at least one electrical accessory emits a fragrance.

3. The smart safe console system of claim 2, wherein the safe body includes at least one soundproofing material.

4. The smart safe console system of claim 3 wherein the at least one soundproofing material dampens or inhibits sounds of the electronic device from reaching the user.

5. A method comprising:
   providing, to a vehicle, a smart safe console assembly, the smart safe console assembly including:
      a safe body, wherein the safe body opens and closes, and, when closed, the safe body secures an electronic device against physical access;
      a button that controls input to and output from the electronic device;
      a port configured to provide the electronic communication with at least one electrical accessory;
      a control module that is configured to prevent the vehicle from moving unless the safe body is closed and the electronic device is secured within the safe body;
      an electromagnetic field (EMF) battery positioned below the console system and is configured prevent radiation from emitting from said electronic device when housed within the safe body; and
      a sensor to detect and communicate a signal that the electronic device is secured to the control module
   wherein the assembly communicates with a provider and with the vehicle,
   wherein the provider provides phone or Internet service,
   wherein the assembly communicates with at least one vehicle sensor to receive condition information about the vehicle,
   wherein the at least one vehicle sensor is at least one of: a proximity sensor, a motion sensor, a speed sensor, an audio sensor, an audio loudness sensor, or an impact sensor,
   wherein the accessory includes a transmitter configured to communicate with a controller and a processor,
   wherein the button initiates communication with a virtual assistant of the electrical accessory or device,
   wherein the electronic device executes software application instructions that cause the device to register and communicate with the assembly,
      wherein the safe body has a charging unit or a docking station for the electronic device;
   registering the electronic device with the smart safe assembly;
   securing the electronic device in the safe body;
   connecting the electronic device to a charging unit disposed in the safe body;
   sensing the electronic device connection to the charging unit;
   closing the safe body;
   sensing that the safe body is closed; and
   operating the vehicle.

6. The method of claim 5, further comprising engaging the button.

* * * * *